US010786936B2

(12) United States Patent
Lin et al.

(10) Patent No.: US 10,786,936 B2
(45) Date of Patent: Sep. 29, 2020

(54) THREE-DIMENSIONAL PRINTING METHOD

(71) Applicants: XYZprinting, Inc., New Taipei (TW);
Kinpo Electronics, Inc., New Taipei (TW)

(72) Inventors: Tsai-Yi Lin, New Taipei (TW);
Chien-Te Lee, New Taipei (TW);
Chen-Fu Huang, New Taipei (TW);
An-Hsiu Lee, New Taipei (TW)

(73) Assignees: XYZprinting, Inc., New Taipei (TW);
Kinpo Electronics, Inc., New Taipei (TW)

( * ) Notice: Subject to any disclaimer, the term of this patent is extended or adjusted under 35 U.S.C. 154(b) by 321 days.

(21) Appl. No.: 15/871,023

(22) Filed: Jan. 14, 2018

(65) Prior Publication Data

US 2019/0184618 A1 Jun. 20, 2019

(30) Foreign Application Priority Data

Dec. 15, 2017 (CN) .......................... 2017 1 1344557

(51) Int. Cl.
*B33Y 10/00* (2015.01)
*B29C 45/76* (2006.01)
(Continued)

(52) U.S. Cl.
CPC ........ *B29C 45/7626* (2013.01); *B29C 64/124* (2017.08); *B29C 64/241* (2017.08);
(Continued)

(58) Field of Classification Search
CPC . B29C 45/7626; B29C 64/124; B29C 64/393; B29C 64/241; B33Y 50/02; B33Y 40/00
(Continued)

(56) References Cited

U.S. PATENT DOCUMENTS

2011/0241259 A1* 10/2011 Ottens ................. G03F 7/70341
264/401
2011/0310370 A1* 12/2011 Rohner .............. A61C 13/0013
355/53
(Continued)

FOREIGN PATENT DOCUMENTS

EP 1769900 4/2007
EP 1769904 4/2007

OTHER PUBLICATIONS

"Search Report of Europe Counterpart Application", dated Jan. 11, 2019, p. 1-p. 9.

*Primary Examiner* — Jeffrey M Wollschlager
*Assistant Examiner* — Xue H Liu
(74) *Attorney, Agent, or Firm* — JCIPRNET

(57) ABSTRACT

A three-dimensional printing method for a three-dimensional printing system including a tank, a platform, an injection module, a warning module, a curing module, and a control module is provided. The control module is electrically connected to the curing module, the injection module, and the warning module. The method includes: analyzing a required amount of the liquid forming material corresponding to a three-dimensional object; obtaining a safe amount of the liquid forming material in the tank; and comparing the required amount and the safe amount, wherein the control module provides a response signal to the injection or warning module when the safe amount is less than the required amount. The injection module receives the response signal to inject the liquid forming material to the tank. The warning module receives the response signal to remind a user to provide the liquid forming material to the tank.

14 Claims, 4 Drawing Sheets

(51) Int. Cl.
*B33Y 50/02* (2015.01)
*B29C 64/124* (2017.01)
*B29C 64/393* (2017.01)
*B29C 64/241* (2017.01)
*B33Y 40/00* (2020.01)

(52) U.S. Cl.
CPC ............ *B29C 64/393* (2017.08); *B33Y 10/00* (2014.12); *B33Y 50/02* (2014.12); *B33Y 40/00* (2014.12)

(58) Field of Classification Search
USPC ....................................................... 264/401
See application file for complete search history.

(56) References Cited

U.S. PATENT DOCUMENTS

| | | |
|---|---|---|
| 2015/0183168 A1 | 7/2015 | Liverman et al. |
| 2015/0231824 A1 | 8/2015 | Kobayashi |
| 2017/0057174 A1 | 3/2017 | Megretski et al. |
| 2017/0057177 A1 | 3/2017 | Ferguson et al. |

* cited by examiner

THREE-DIMENSIONAL PRINTING METHOD

CROSS-REFERENCE TO RELATED APPLICATION

This application claims the priority benefit of China application Ser. No. 201711344557.7, filed on Dec. 15, 2017. The entirety of the above-mentioned patent application is hereby incorporated by reference herein and made a part of this specification.

TECHNICAL FIELD

The disclosure relates to a three-dimensional printing method.

BACKGROUND

In recent years, three-dimensional printers have been broadly applied in various fields, and various three-dimensional printing technologies are emerging one after another, which creates an era where everything is printable. Photopolymer is adopted as a liquid forming material for a majority of the three-dimensional printing systems. For example, photopolymer is adopted as the printing material in technologies such as the stereolithography apparatus (SLA), the digital light processing (DLP) technology, and the continuous liquid interface production (CLIP), etc. However, due to the higher cost of photopolymer, the usage of photopolymer becomes a concern of the user. If the material provided is more than the material eventually required for curing during a printing process, the costs may be wasted. Besides, photopolymer is prone to be influenced by environmental factors, and may be gradually cured and become unusable as the time progresses.

Therefore, the usage of photopolymer as a main consumable material in three-dimensional printing needs to be precisely controlled, so as to optimize the supply and the stability of the yield and reduce the cost.

SUMMARY

One or some exemplary embodiments of the disclosure provide a three-dimensional printing method capable of facilitating the usage efficiency of liquid forming material and ensuring that the liquid forming material in a tank is sufficient to fill back.

A three-dimensional printing method according to an embodiment of the disclosure is suitable for a three-dimensional printing system. The system includes a tank, a platform, an injection module, a warning module, a curing module, and a control module. The control module is electrically connected to the curing module, the injection module, and the warning module. The injection module is controlled by the control module to inject a liquid forming material into the tank. The curing module is controlled by the control module to print a three-dimensional object by sequentially curing and stacking layers of the liquid forming material on the platform. The three-dimensional printing method includes: analyzing the three-dimensional object and obtaining a required amount $V_{require}$ of the liquid forming material corresponding to the three-dimensional object; obtaining a safe amount $V_{safety}$ of the liquid forming material in the tank; and comparing the required amount and the safe amount by the control module and providing a response signal to the injection module or the warning module. The injection module receives the response signal to inject the liquid forming material to the tank, and the warning module receives the response signal to remind the user to provide the liquid forming material to the tank.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
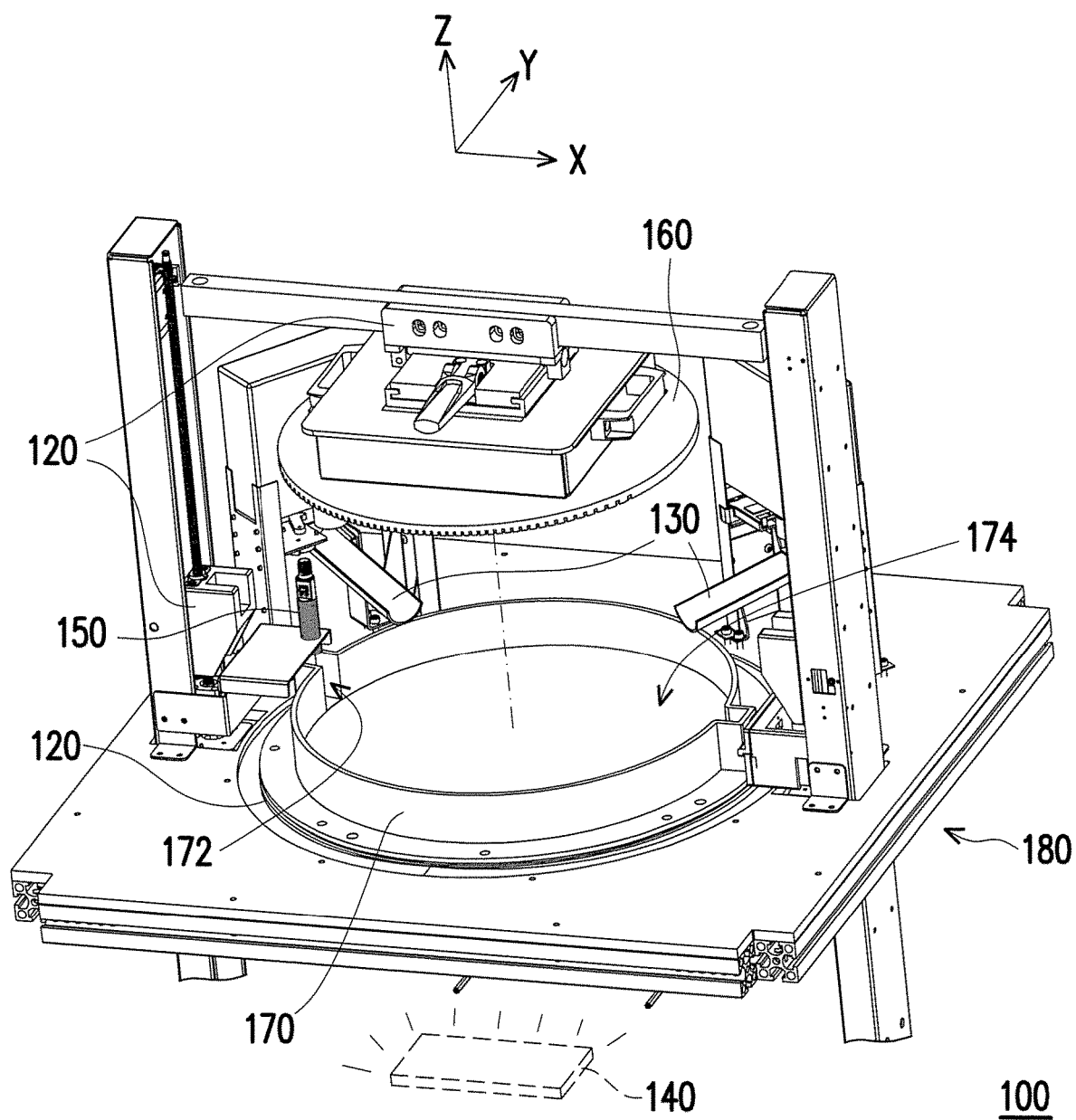
FIG. 1 is a partial schematic view illustrating a three-dimensional printing system.

Descriptions of the invention are given with reference to the exemplary embodiments illustrated with accompanied drawings, wherein same or similar parts are denoted with same reference numerals. Wherever possible, the same reference numbers are used in the drawings and the description to refer to the same or like parts.

Figure 2:
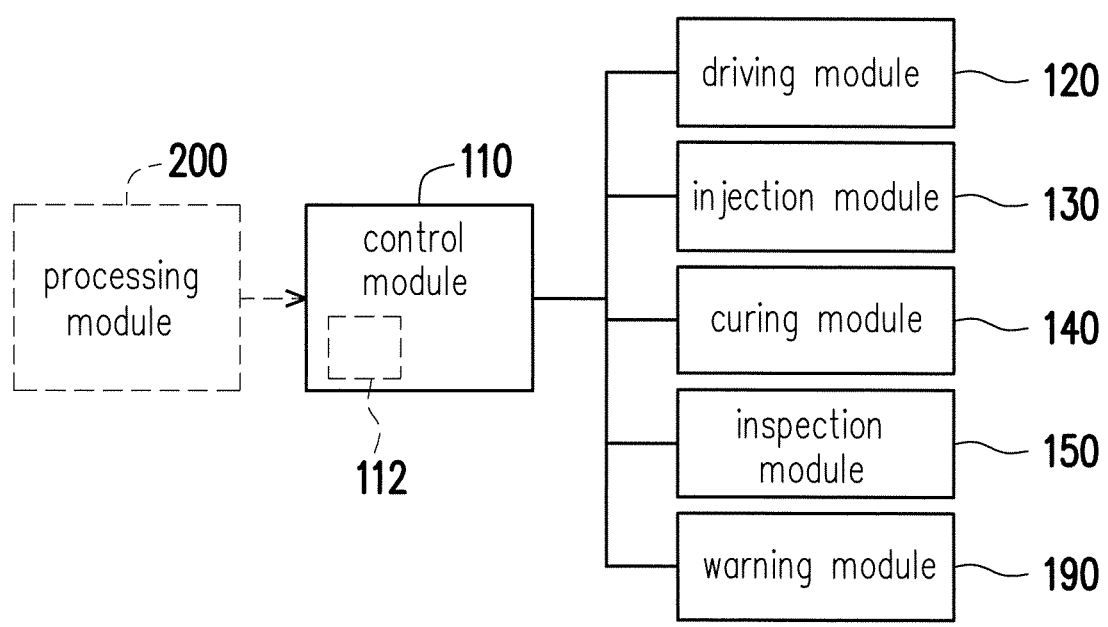
FIG. 2 is a schematic view illustrating electrical connections among some components in a three-dimensional printing system.

FIG. 1 is a partial schematic view illustrating a three-dimensional printing system. FIG. 2 is a schematic view illustrating electrical connections among some components in a three-dimensional printing system. A Cartesian coordinates system X-Y-Z is provided herein to describe components more easily. Referring to FIGS. 1 and 2, in the embodiment, a three-dimensional printing system 100, such as a stereolithography apparatus (SLA), includes a control module 110, a driving module 120, an injection module 130, a curing module 140, an inspection module 150, a platform 160, a tank 170, a base 180, and a warning module 190. As shown in FIG. 1, the driving module 120 includes a gantry movable stage disposed on the base 180. The platform 160 is disposed to and driven by the gantry movable stage to move on the X-Z plane. Besides, the driving module 120 further includes a rotary mechanism disposed in the base 180. The tank 170 is disposed on the rotary mechanism to be rotatable by adopting Z-axis as a rotary axis. Details concerning the driving module 120 can be learned from known movement mechanisms and thus will not be repeated in the following. Here, the driving module 120 is electrically connected to and controlled by the control module 110 for driving.

The injection module 130 is disposed on the base 180 to inject a liquid forming material into the tank 170. The curing module 140 is disposed in the base 180 and located below the tank 170. Therefore, when the platform 160 is driven and immersed into the liquid forming material of the tank 170, the curing module 140 may provide curing light (e.g., ultraviolet light) through the bottom of the tank 170 (made of a transparent material, for example) to cure the liquid forming material into a forming layer folk lied at the platform 160. As the platform 160 is driven to gradually move toward the positive Z-axis direction, a plurality of forming layers are formed in a layer-by-layer manner and stacked. Eventually, a three-dimensional object is printed at the platform 160. Here, the means of forming the three-dimensional object and corresponding components in the three-dimensional printing system 100 are already taught in the SLA technology. Therefore, details in this regard will not be repeated in the following. Here, the injection module 130 and the curing module 140 are respectively electrically connected to the control module 110 for printing.

In the embodiment, an inner bottom surface of the tank 170 is greater. More specifically, the inner bottom surface of the tank 170 of the embodiment exhibits a circular profile, and an outer diameter of the tank 170 is greater than or equal to 300 mm. Therefore, in a case when a projection area of the three-dimensional object on the platform 160 is relatively small, the liquid forming material in a majority of the area is not subjected to curing by the curing module 140. Therefore, if an excessive amount of the liquid forming material is provided, the usage rate of the liquid forming material is relatively low and the liquid forming material may be wasted. Besides, the liquid forming material may deteriorate when exposed to the environment for an excessively long period. In order to effectively control the usage of the liquid forming material and prevent the liquid forming material from deteriorating due to an excessive amount of the liquid forming material injected during a three-dimensional printing process, a specific means is implemented in the embodiment to exert control and thereby facilitate the usage efficiency of the liquid forming material.

Figure 3A:
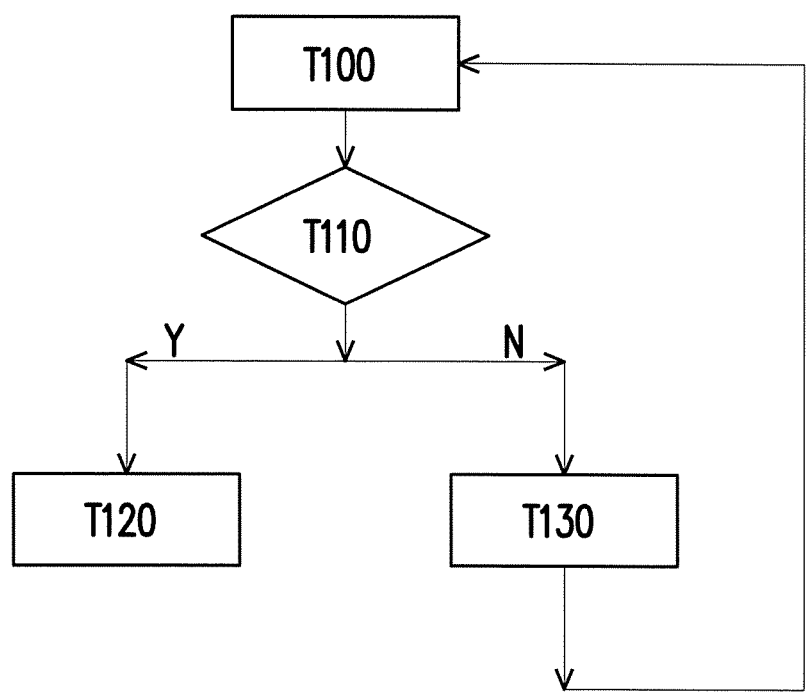
FIGS. 3A to 3C are respectively flowcharts of a three-dimensional printing method.
Figure 3B:
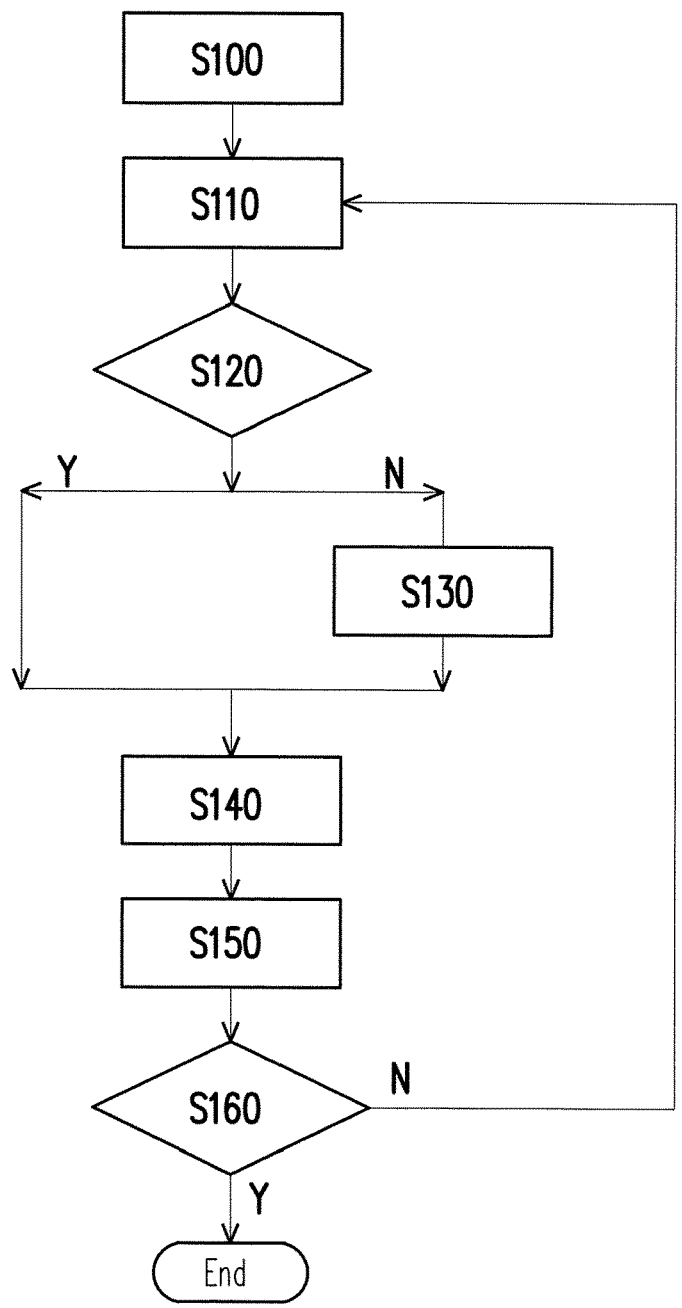
Figure 3C:
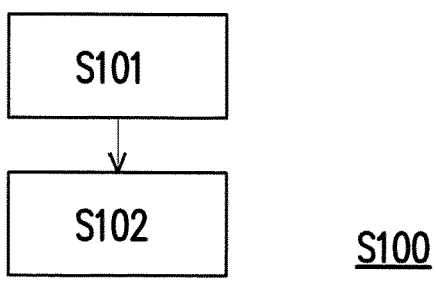

FIGS. 3A to 3C are respectively flowcharts of a three-dimensional printing method.

Referring to FIG. 3A, at Step T100, model information of the three-dimensional object is analyzed to obtain a required amount ($V_{require}$) of the liquid forming material corresponding to the three-dimensional object. Meanwhile, a safe amount ($V_{safety}$) of the liquid forming material in the tank 170 is also obtained. Then, at Step T110, the control module 110 compares the required amount ($V_{require}$) to the safe amount ($V_{safety}$) and generates a corresponding signal. When the required amount ($V_{require}$) is greater than or equal to the safe amount ($V_{safety}$), the control module 110 provides a response signal to the injection module 130 or the warning module 190 at Step T120. Accordingly, the injection module 130 may inject the liquid forming material into the tank 170 based on the response signal, or the warning module 190 may warn a user and thereby remind the user to provide the liquid forming material to the tank 180. When the required amount ($V_{require}$) is less than the safe amount ($V_{safety}$), the control module 110 provides the response signal to the injection module 130 or the warning module 190 at Step T130. Accordingly, the injection module 130 may provide the liquid forming material to the tank 170 or for the warning module 190 may send a warning and thereby remind the user to provide the liquid forming material to the tank 170. More specifically, the corresponding Steps T120 and T130 differ in that when the required amount ($V_{require}$) is greater than the safe amount ($V_{safety}$), no matter which way is adopted, an injected amount ($V_m$) of the liquid forming material provided to the tank 170 exhibits a relation of ($V_m$)≤($V_{require}$). Comparatively, when the required amount ($V_{require}$) is less than the safe amount ($V_{safety}$), no matter how the material is injected, the injected amount ($V_m$) of the liquid forming material provided to the tank 170 exhibits a relation of ($V_m$)>($V_{require}$), and the flow shall return to Step T100 to ensure that the liquid forming material in the tank 170 satisfies the safe amount ($V_{safety}$) after the injection.

Specifically, referring to FIG. 3B together with FIGS. 1 and 2, in the three-dimensional printing method of the embodiment, the three-dimensional object is analyzed at Step S100 to obtain the corresponding required amount ($V_{require}$) of the liquid forming material. In other words, at Step S100, the volume of the three-dimensional object is analyzed to convert the volume into a capacity of the required liquid forming material. In addition, relevant conditions, such as material properties and an environment of use of the liquid forming material, need to be considered to obtain a conversion ratio between uncured and cured liquid forming materials. Then, a model parameter of the three-dimensional object may be loaded into the control module 110 of the three-dimensional printing system 100 after a layered analysis performed by an external processing module 200. Alternatively, the analysis may also be directly carried out by a processor 112 of the control module 110. The disclosure does not intend to impose a limitation on this regard.

Then, referring to Step S110 and FIG. 1, in the embodiment, the inspection module 150 is disposed to the base 180 and above the tank 170. In addition, the inspection module 150 is electrically connected to the control module 110 and transmits relevant information received after inspecting the liquid forming material in the tank 170 to the control module 110. Here, the inspection module 150 is an ultrasonic wave module, for example. The inspection module 150 is disposed above the tank 170 and corresponds to an inspection region 172 (i.e., a region of the tank 170 not covered by the platform 160) of the tank 170 to inspect a liquid level and a variation of the liquid forming material in the tank 170. In other embodiments not shown herein, the inspection module may also be an infrared light module or a capacitor module similarly capable of inspecting the liquid forming material in the tank 170 to verify the liquid level and the variation of the liquid forming material.

Hence, at Step S110, the control module 110 drives the inspection module 150 to inspect the liquid forming material in the tank 170, so as to obtain a current residual amount ($V_{residual}$) of the liquid forming material and thus transmit information about the current residual amount ($V_{residual}$) to the control module 110 for a subsequent comparison process.

However, to ensure smooth performance of the subsequent printing process, the three-dimensional printing method of the embodiment further includes Step S120. Specifically, the processor 112 of the control module 110 may compare the residual amount ($V_{residual}$) with the predetermined safe amount ($V_{safety}$) to determine whether the current residual amount ($V_{residual}$) is greater or less than or equal to the safe amount ($V_{safety}$). Here, an area that the liquid forming material in the safe amount ($V_{safety}$) in the tank 170 contacts air is R, a height of the liquid forming material in the tank 170 is H, and the safe amount ($V_{safety}$) is represented as the following: safe amount ($V_{safety}$)=R×H. More specifically, the liquid forming material in the safe amount ($V_{safety}$) is able to completely cover the inner bottom surface 174 of the tank 170, and the height H is a minimum height required for the liquid forming height to completely cover the inner bottom surface 174 of the tank 170.

In other words, the safe amount ($V_{safety}$) represents an amount of the liquid forming material in the tank 170 capable of completely covering the inner bottom surface 174 of the tank 170 when the tank 170 is rotated or the platform 160 enters and exits the tank 170 to cause disturbance or waves in the liquid forming material. Also, since the tank 170 of the embodiment substantially has a large area, the amount of the injected liquid forming material needs to be controlled precisely. Therefore, the safe amount ($V_{safety}$) of the embodiment may be R/H≤0.004%. For example, when the inner bottom surface 174 exhibits a circular profile and the diameter thereof is 300 mm, the required height H may be 3 mm (i.e., 3 mm/π*150 mm²~0.004%). Here, the height H is set to ensure that the liquid forming material may quickly fills back and be distributed across the bottom surface 174 of the whole tank 1701. In other words, the safe amount ($V_{safety}$) is the minimum amount required for the liquid forming material in the tank 170 to fill back for three-dimensional printing.

Hence, it is ensured that, wherever in the tank 170 the three-dimensional printing is performed, the liquid forming material is still available for smooth performance of the three-dimensional printing. Besides, since the liquid forming material generally has a high viscosity, i.e., a low fluidity, when disturbance or waves are caused in the liquid forming material, it takes longer for the liquid forming material to return to the horizontal level (i.e., the X-Y plane of the embodiment). Therefore, by setting the safe amount ($V_{safety}$) of the liquid forming material in the tank 170, the time required to wait for the liquid forming material to fill back is reduced. In other words, when the capacity of the liquid forming material in the tank 170 is already greater than or equal to the safe amount ($V_{safety}$), it is not necessary to wait for the liquid forming material to return to the horizontal level. Therefore, the manufacturing time does not increase.

Accordingly, as shown in Step S130, when the inspection module 150 finds that the capacity of the liquid forming material in the tank 170 is less than the safe amount ($V_{safety}$), the control module 110 may drive the injection module 130 to inject the liquid forming material into the tank 170 until the capacity of the liquid forming material in the tank 170 is greater than or equal to the safe amount ($V_{safety}$). Then, Step S140 is performed. Comparatively, if the capacity of the liquid forming material in the tank 170 already satisfies a condition of being greater than or equal to a buffer amount ($V_{buffer}$), Step S140 is directly performed.

At Step S140 of the embodiment, the control module 110 may further compare the current residual amount ($V_{residual}$) obtained through inspection and the required amount ($V_{require}$) obtained through analysis to determine whether the number (m) of times of injecting the liquid forming material into the tank 170 and the injected amount. The injected amount is represented as $\{V_m\}=V_0, V_1, V_2 \ldots V_m$, wherein m≤0 and m is an integer, and $V_m \leq V_{require}$. In other words, when ($V_{residual}$)<($V_{safety}$), the injected amount is represented as ($V_m$)=($V_{require}$)+[($V_{safety}$)−($V_{residual}$)], when ($V_{residual}$)>($V_{safety}$), the injected amount is represented as ($V_m$)=($V_{require}$)−($V_{residual}$), and when ($V_{residual}$)=($V_{safety}$), the injected amount is represented as ($V_m$)=($V_{require}$).

Then, at Step S150, after the injection module 130 is driven by the control module 110 to inject the liquid forming material in the injected amount ($V_m$) into the tank 170, the control module 110 then drives the curing module 140 to cure the liquid forming material in the injected amount ($V_m$), so as to form the forming layer on the platform 160. Namely, in the embodiment, the liquid forming material is controlled in the three-dimensional printing method of the embodiment, and is injected only before curing. Therefore, the retention time of the liquid forming material in the tank 170 is effectively reduced to keep the liquid forming material fresh (i.e., avoid deterioration) and thereby facilitate the printing quality of the three-dimensional object. Besides, the usage efficiency of the liquid forming material is increased, and the usage of the liquid forming material is reduced.

Then, at Step S160, the control module 110 determines whether printing of the three-dimensional object is completed at Step S150. If yes, the three-dimensional printing process of the embodiment is ended. If not, Step S110 is performed again. Specifically, the control module 110 may control the inspection module 150 to inspect the liquid forming material in the tank 170 to verify how the liquid forming material is changed after the injection and curing at Step S150, so as to obtain another current residual amount ($V_{residual}'$). Then Steps S120 to S150 are performed again. Specifically, the another current residual amount ($V_{residual}'$) is compared with the safe amount ($V_{safety}$) to determine the injected amount ($V_m$) required in the next three-dimensional printing process, until the three-dimensional object is completely printed.

In the embodiment, the required amount ($V_{require}$) and the safe amount ($V_{safety}$) of the liquid forming material may be respectively determined based on the material properties of the liquid forming material and the environment of use. For example, when the required amount ($V_{require}$) is equal to the safe amount ($V_{safety}$), or when ($V_{residual}$)=($V_{safety}$), the injected amount ($V_m$) of the liquid forming material required to be injected into the tank 170 is the required amount ($V_{require}$). However, if the evaporation rate of the liquid forming material in the tank 170 is also taken into consideration, the actual amount injected into the tank 170 should be an adjustment value ($V_a$) in addition to the required amount ($V_{require}$). The adjustment value ($V_a$) is a variation value provided to the injection module 130 based on an environmental factor or the material properties of the liquid forming material or a suggested value reminding the user through the warning module 190. The adjustment value ($V_a$) may be properly adjusted based on the environment of the three-dimensional printing system and the properties of the liquid forming material. Nevertheless, the adjustment value ($V_a$) is still determined under a premise that the liquid forming material in the tank 170 is be able to fill back.

Also, referring to FIG. 3C, the analysis at Step S100 in the embodiment further includes Step S101 and Step S102. At Step 101, a layered (slicing) analysis is performed on the three-dimensional object to decompose the three-dimensional object into a plurality of forming layers $\{A_n\}$, wherein $\{A_n\}=A_1, A_2, A_3, \ldots, A_n$, and n is a positive integer. Then, at Step S102, the plurality of forming layers $\{A_n\}$ is respectively analyzed to obtain a required single-layer capacity ($V_n$) corresponding to the liquid forming material. In other words, the single-layer capacity ($V_n$) is substantially obtained through conversion from the volume of the single forming layer ($A_n$).

Therefore, the control module 110 may determine the injected amount ($V_m$) of the liquid forming material required at Step S140 based on the single-layer capacity ($V_n$). In addition, the injected amount ($V_m$) is greater than or equal to the single-layer capacity ($V_n$) More specifically, when the single injected amount ($V_m$) is equal to the single-layer capacity ($V_n$), the liquid forming material as required is injected into the tank 170 in a layer-by-layer manner. In addition, the cured module 140 is controlled by the control module 110 to cure the liquid forming material in a layer-by-layer manner (i.e., sequentially performing one single curing process after another). In other words, the amount of the liquid forming material injected by the injection module 130 each time only meets the single-layer capacity ($V_n$). However, the embodiment is not limited thereto. In another aspect, the single injected amount ($V_m$) is a positive integer multiple of the single-layer capacity ($V_n$). In other words, the single injected amount ($V_m$) may cover a capacity of the liquid forming material corresponding a plurality of forming layers, i.e., single injected amount ($V_m$)=p×single-layer capacity ($V_n$), wherein p is a positive integer greater than 2. Therefore, after the single injected amount ($V_m$)=p×single-layer capacity ($V_n$) is injected into the tank 170, the control module 110 may drive the curing module 140 to cure the liquid forming material in the amount of the single injected amount $(V_m)$=p×single-layer capacity $(V_n)$ for a plurality of times to form a plurality of forming layers at the platform 160.

It should be noted that the respective injection modes, i.e., single injected amount $(V_m)$=single-layer capacity $(V_n)$ and injected amount $(V_m)$=p×single-layer capacity $(V_n)$, may be used together in an appropriate manner to facilitate the efficiency of the three-dimensional printing method and take care of the quality of the three-dimensional object. In other words, the relation may be represented as: single injected amount $(V_m)$=k×single-layer capacity $(V_n)$, wherein k is a positive integer.

Besides, in another embodiment not shown herein, the value of k may also be a non-positive-integer. In other words, k=g+h, wherein g is a positive integer, and 0≤h≤1. Namely, during the printing process, the single injected amount $(V_m)$ may depend on a status of the liquid forming material in the tank 170. In the embodiment, a value of the added h represents additional supplementation to cope with a potential loss of the liquid forming material during the printing process.

In view of the foregoing, in the three-dimensional printing method according to the embodiments of the disclosure, the required amount of the liquid forming material corresponding to the three-dimensional object is obtained, and the current residual amount is obtained by inspecting the liquid forming material in the tank using the inspection module. After comparing the required amount and the residual amount, the number of times of driving the injection module to inject the liquid forming material into the tank and the injected amount are determined accordingly. Hence, an appropriate amount of the liquid forming material is injected to avoid deterioration, for example. Meanwhile, since the injected amount of the liquid forming material based on needs is correspondingly changed based on a layering result of the three-dimensional object, the liquid forming material in the tank may be controlled in a real-time manner as the three-dimensional printing process progresses. Therefore, the usage efficiency of the liquid forming material is facilitated, the cost is reduced, and the quality of the three-dimensional object is also taken into consideration.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing method, suitable for a three-dimensional printing system comprising a tank, a platform, an injection module, a warning module, a curing module, and a control module, wherein the control module is electrically connected to the curing module, the injection module, and the warning module, the injection module is controlled by the control module to inject a liquid forming material into the tank, the curing module is controlled by the control module to print a three-dimensional object by sequentially curing and stacking layers of the liquid forming material on the platform, and the three-dimensional printing method comprises:

analyzing the three-dimensional object and obtaining a required amount $V_{require}$ of the liquid forming material corresponding to the three-dimensional object;

obtaining a safe amount $V_{safety}$ of the liquid forming material in the tank, wherein the safe amount $V_{safety}$ is a minimum amount required for the liquid forming material in the tank to completely cover an inner bottom surface of the tank and for three-dimensional printing to be performed; and comparing the required amount $V_{require}$ and the safe amount $V_{safety}$ by the control module and providing a response signal to the injection module or the warning module, wherein the injection module receives the response signal to inject the liquid forming material to the tank, and the warning module receives the response signal to remind a user to provide the liquid forming material to the tank.

2. The three-dimensional printing method as claimed in claim 1, wherein the three-dimensional printing system further comprises an inspection module electrically connected to the control module, and the three-dimensional printing method further comprises:

driving the inspection module by the control module during a three-dimensional printing process to inspect the liquid forming material in the tank, so as to obtain a current residual amount $V_{residual}$ of the liquid forming material in the tank; and comparing the current residual amount $V_{residual}$ with the safe amount $V_{safety}$ and providing the response signal to the injection module or the warning module by the control module.

3. The three-dimensional printing method as claimed in claim 2, wherein when $V_{residual}<V_{safety}$, the injection module provides the liquid forming material in an injected amount $V_m$ to the tank based on the response signal, or the warning module provides a warning with the injected amount $V_m$ to notify the user, and $V_m=V_{require}+[V_{safety}-V_{residual}]$; when $V_{residual}>V_{safety}$, the injection module provides the liquid forming material in the injected amount $V_m$ to the tank based on the response signal, or the warning module provides another warning with the injected amount $V_m$ to notify the user, and $V_m=V_{require}-V_{residual}$; and when $V_{residual}=V_{safety}$, the injection module provides the liquid forming material in the injected amount $V_m$ to the tank based on the response signal, or the warning module provides the warning with another injected amount $V_m$ to notify the user, and $V_m=V_{require}$.

4. The three-dimensional printing method as claimed in claim 1, wherein an area of the liquid forming material in the safe amount $V_{safety}$ contacting air in the tank is R, a height of the liquid forming material in the tank is H, and $V_{safety}=R\times H$, wherein the liquid forming material with the area R completely covers the inner bottom surface of the tank, and the height is a minimum height required for the liquid forming material to completely cover the inner bottom surface of the tank.

5. The three-dimensional printing method as claimed in claim 4, wherein R/H≤0.004%.

6. The three-dimensional printing method as claimed in claim 3, further comprising:

analyzing and decomposing the three-dimensional object into a plurality of forming layers $\{A_n\}$, wherein $\{A_n\}=A_1, A_2, A_3, \ldots, A_n$, and n is a positive integer; and analyzing and obtaining the liquid forming material with a single-layer capacity $V_n$ corresponding to the forming layer $A_n$, wherein the injected amount $V_m$ is greater than or equal to the single-layer capacity $V_n$.

7. The three-dimensional printing method as claimed in claim 6, wherein the injected amount $V_m$ is a positive integer multiple of the single-layer capacity $V_n$.

8. The three-dimensional printing method as claimed in claim 3, wherein the control module drives the curing module to perform a single curing process on the liquid forming material in the injected amount $V_m$ to form a single forming layer on the platform.

9. The three-dimensional printing method as claimed in claim 3, wherein the control module drives the curing module to perform a plurality of curing processes on the liquid forming material in the injected amount $V_m$ to form a plurality of forming layers on the platform.

10. The three-dimensional printing method as claimed in claim 1, wherein an inner bottom surface of the tank exhibits a circular profile, and a diameter of the circular profile is greater than or equal to 300 mm.

11. The three-dimensional printing method as claimed in claim 3, wherein after the liquid forming material in the injected amount $V_m$ being cured, the control module drives the inspection module to inspect the liquid forming material in the tank, so as to obtain another current residual amount $V_{residual}'$ in the tank; and the control module compares again the another current residual amount $V_{residual}'$ and the safe amount $V_{safety}$ to determine the injected amount $V_m$ required in a next three-dimensional printing process.

12. The three-dimensional printing method as claimed in claim 2, wherein the inspection module is an ultrasonic wave module inspecting a liquid level and a variation of the liquid forming material in the tank.

13. The three-dimensional printing method as claimed in claim 2, wherein the inspection module is an infrared light module inspecting a liquid level and a variation of the liquid forming material in the tank.

14. The three-dimensional printing method as claimed in claim 2, wherein the inspection module is a capacitor module inspecting a liquid level and a variation of the liquid forming material in the tank.

* * * * *